(12) United States Patent
Cheriton

(10) Patent No.: US 7,310,306 B1
(45) Date of Patent: Dec. 18, 2007

(54) METHOD AND APPARATUS FOR INGRESS PORT FILTERING FOR PACKET SWITCHING SYSTEMS

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1125 days.

(21) Appl. No.: 09/981,125

(22) Filed: Oct. 16, 2001

(51) Int. Cl.
*G01R 31/08* (2006.01)

(52) U.S. Cl. ........................ 370/218; 370/220

(58) Field of Classification Search ................ 370/216, 370/217, 218, 219, 220
See application file for complete search history.

(56) References Cited

U.S. PATENT DOCUMENTS

| | | | |
|---|---|---|---|
| 5,408,463 A * | 4/1995 | Merchant et al. ........... 370/218 |
| 5,495,426 A | 2/1996 | Waclawsky et al. |
| 5,612,897 A | 3/1997 | Rege |
| 5,664,108 A * | 9/1997 | Heaton et al. .............. 709/252 |
| 5,790,554 A * | 8/1998 | Pitcher et al. .............. 370/471 |
| 6,032,194 A | 2/2000 | Gai et al. |
| 6,188,694 B1 | 2/2001 | Fine et al. |
| 6,493,318 B1 * | 12/2002 | Bare ........................... 370/238 |
| 2002/0021661 A1 * | 2/2002 | DeGrandpre et al. ....... 370/219 |
| 2002/0039366 A1 * | 4/2002 | Sano .......................... 370/390 |

\* cited by examiner

*Primary Examiner*—Chau Nguyen
*Assistant Examiner*—Jung Park
(74) *Attorney, Agent, or Firm*—The Law Office of Kirk D. Williams

(57) ABSTRACT

Methods and apparatus are disclosed herein for ingress port filtering for packet switching systems. One implementation includes a mechanism to duplicate and provide an incoming packet stream to multiple per-port ingress filters. Under standard operating conditions, these filters are configured to be cooperative and complementary, with the portion of packet traffic filtered out of the stream on one port allowed to pass through on the other ports so as to load balance traffic across redundant systems. Upon recognition of a failure condition, the filters are typically modified to adapt to the error condition, which may include allowing all traffic to pass through one ingress port while filtering all traffic from the other ingress ports, or dynamically re-programming the filters to effectively redistribute the portion of the traffic going to an ingress port associated with the error condition to the other ingress ports.

26 Claims, 5 Drawing Sheets

METHOD AND APPARATUS FOR INGRESS PORT FILTERING FOR PACKET SWITCHING SYSTEMS

FIELD OF THE INVENTION

This invention relates to communications and computer systems, and in particular routers and other packet switching systems; and more particularly, the invention relates to ingress port filtering for packet switching systems.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Service consumers and providers demand increased performance and high availability, and thus the high-performance switches and routers used to provide these communications services are often under the double demands of being fault-tolerant as well as handling worst-case traffic patterns effectively.

A conventional approach in attempting to provide a fault tolerant system is to provision systems with duplicate resources, such as a replicated backplane or crossbar, and duplicate line cards, and then rely on a mechanism to switch the traffic from one component to its duplicate or backup component when failure of the first is detected. In one configuration, two instances of a line card are provided, with the optical connection to a port being optically split and connected to a corresponding port on the second line card. A simple binary ingress port filter blocks all traffic at the port to the second line card until it determines the first has failed. At this time, the filter is changed from block-all to block-none, allowing the second line card to quickly take over and forward the packet traffic. Ideally, the filters on the first line card can be set to block-all at this time, if it is operational enough to do so, to ensure no duplicate forwarding of the packet traffic. This fault tolerant configuration typically handles failures well, but requires a fully-duplicated line cards that provides no benefit except in the failure case, and each card must be designed to accommodate the worst-case traffic patterns that can exist.

Designing a packet switch to handle worst-case traffic can be expensive, and impractical in some settings. For example, with regards to multicast information streams, bursts of packets to addresses with large fan-out can require the switch to process a large number of packet replications for each packet, one for each output transmission required by the multicast. And, this replication is required for each multicast packet arriving at wire rate. In particular, with a fan-out of 200 for an address and packets arriving every one microsecond on a port, a line card may need to replicate the packets 200,000,000 times per second, exceeding the capabilities of most hardware. Sustained rates at this level are not generally needed, but bursts of this nature can occur, and failure to handle them generally leads to indiscriminant ingress packet drops, often harming the flows that are not significant contributors to the burst and limiting any guarantees one can make on quality of service. Large-scale switches especially suffer from this problem. The approach of providing multicast support in the crossbar increases the cost and complexity of the interconnect and also often compromises flow control within the switch, interfering with QoS properties under load, which is when they are important. The approach of passing multicast packets to a "replication" server card connected to the switch fabric does not scale well, does not handle the failure case well, and uses extra fabric bandwidth.

As a second example, minimum-sized packets and packets that are of length slightly greater than the internal transfer unit (often called "cell size") can require memory bandwidths and transfer rates that are far in excess of average bandwidth. For example, with a 64-byte cell size, packets that are 65-bytes in length require almost twice the bandwidth to handle at full rate compared to the average 300 byte packets.

With the demand for ever higher link speeds (moving now to multiple gigabits per second) and the corresponding demand for more ports per switch and the potential increase in the use of multicast, the difficulty of handling worst-case behavior is expected to remain significant. Moreover, as individual switches handle large amount of traffic and the network becomes ever more important in enterprises and the commerce in general, fault-tolerance of these devices is critical. Needed are new methods and apparatus for providing fault tolerant packet switching systems.

SUMMARY OF THE INVENTION

Systems and methods are disclosed for ingress port filtering for packet switching systems. One embodiment includes a packet stream splitter and multiple configurable filters coupled to the packet stream splitter. The packet stream splitter is configured to provide a received packet stream to each of the configurable filters. Each of the packet stream splitters are configured to forward a different identifiable first set of packets or to drop a different identifiable second set of packets, and wherein there is at least one packet in the first or the second sets of packets.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
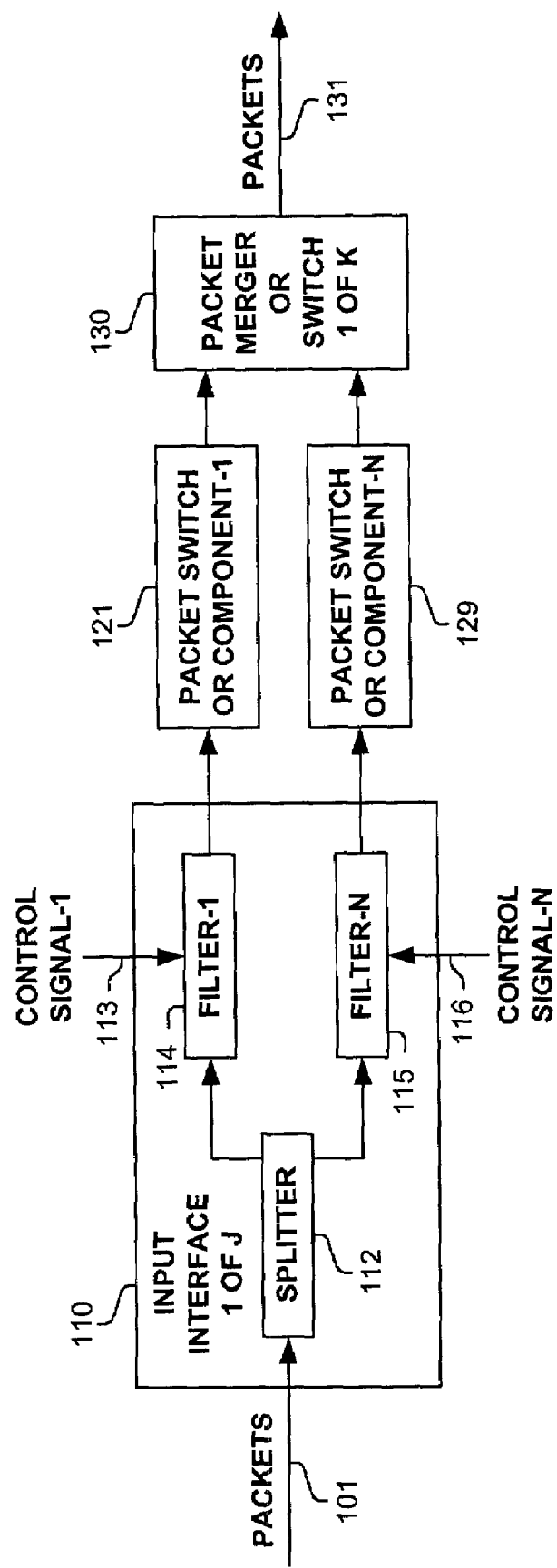
FIGS. 1A-B are block diagrams of embodiments of a packet switching system using ingress port filtering.

Methods and apparatus are disclosed for ingress port filtering for packet switching systems. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information.

Methods and apparatus are disclosed herein that use ingress port filtering for packet switching systems. One embodiment includes a per-port ingress filter on ports of a packet switch, typically before packet forwarding and other packet processing, such as, but not limited to access control list filtering. The ingress filters allow selective reception of traffic. When these ingress filters are dynamically programmable, the packet traffic filtered out or allowed to pass can be modified during operation. In one scenario, these filters may be used to partially or fully block or allow traffic to pass. The modification of this filtering can be done in response to identified failure conditions, traffic patterns, congestion, time of day, or in response to an extensible and unlimited number of identifiable parameters.

One embodiment includes a mechanism to duplicate and provide an incoming packet stream to multiple per-port ingress filters. Under standard operating conditions, these filters are configured to be cooperative and complementary, with the portion of packet traffic filtered out of the stream on one port allowed to pass through on the other ports. For example, filtering can be done in response to any signal internally or externally generated, values of one or more fields of a received packet, including, but not limited to a source address, destination address, packet type, quality of service, type of service, data, etc., or in response to any other stimulus.

Typically, these filters are configured so that a packet is not allowed to pass through two or more filters, so as to alleviate propagating duplicate copies of the same packet. However, in one embodiment, certain packets are allowed to pass through multiple filters. One such use of this packet duplication is to distribute and provide an additional mechanism to provide a multicast operation.

In one embodiment, where the per-port ingress filters are responsive to identified error or failure conditions, traffic of one packet stream is replicated to a set of multiple filters and ingress ports, ideally with independent failure dependencies. In a fully operational state, a different portion of the packet traffic may be allowed to pass through each of the ports. Upon recognition of a failure condition, the filters are modified to adapt to the error condition, which may include allowing all traffic to pass through one ingress port while filtering all traffic from the other ingress ports, or dynamically re-programming the filters to effectively redistribute the portion of the traffic going to an ingress port associated with the error condition to the other ingress ports.

In one embodiment, a large-scale high-speed switch is fully duplicated, with two or more copies of switching hardware and software, including replicated bus or crossbar and line cards. Each link is a fiber optic link that is optically split to connect to ports on at least two independent line cards. For ease of reader understanding, the configuration is described in terms of two line card ports connected to each optic link, although more than two connections are made in certain embodiments. Each line card contains the logic to determine and execute the a forwarding decision on each packet, including replicating the packet in the case of multicast to each egress line card. It also contains some amount of packet buffering to hold packets destined for output to fiber links as well as for input into the connecting backplane bus or crossbar between line cards.

In one embodiment, each line card port has an ingress port filter on it that can be configured by software to accept all, a subset, or none of the arriving packets based on some portion of the packet, such as the packet header. For example, software can configure the filter to block all packets with odd source addresses while configuring the filter on the other port connected to this link to block all packets with even source addresses. By repeating this for the filters on each port in the switch, each port accepts a subset of the traffic that is mutually exclusive to the other port with which it is paired.

In normal operation, the line cards are typically configured as described above, so that each line card handles roughly half the traffic of the links to which it is connected. Based on traffic statistics, software can further refine the filters so that the load is appropriately balanced between the line cards. For example, it may determine that accepting traffic with odd source addresses and odd destination addresses better captures half the traffic than just odd source addresses, modifying the pair of filters accordingly.

With this configuration, if a high level of multicast traffic is received on a link, the task of replicating the packets and forwarding them through the backplane to egress is roughly split between the two line cards, assuming the traffic sources are spread across several addresses. The filter can also apply to additional portions of the packet, such as the destination address, to handle certain traffic patterns, such as too much traffic coming from a single IP address.

On failure of a line card, the filters on the ports paired with those on the failed line card are modified to accept all the traffic while those on the failed line card, if operational to support this, are modified to accept none of the traffic. This failed line card can be disconnected from the backplane by having the backplane refuse packets from it.

The pairing described above can be implemented by pairing line cards, so all ports on one line card are paired with those on a single other line card. More sophisticated pairings can be used in keeping with the scope and spirit of the invention.

The failure detection can be implemented by internal checking mechanisms, external keep-alive messages or by using another technique. Additionally, a line card can be explicitly put in a failed condition in response to operator commands, which would allow the hot swap replacement of line cards, typically without packet traffic being lost.

The fail-over can be detected and/or implemented with various hardware assists. For example, the filter can have a fail-over filter register which specifies the value or values of the filter to use in case of failure of its pair, and a dedicated link to a paired line card that indicates when the other has failed. Similarly, the filter can have a watchdog timer and a mechanism that sets the filter to block-all if the watchdog timer expires. Line card software is then required to reset the watchdog timer periodically to keep the line card ports accepting packets.

Software is expected to configure these filters so that the same packet is not accepted in general at both ports. Otherwise, it is possible for the switch to generate duplicate packets. However, software can configure the ingress port filter so that multicast traffic is accepted on both ports, if it further configures the forwarding information for the associated multicast addresses on the two line cards to forward to mutually exclusive egress cards. For example, a first line card would replicate and forward copies of the multicast to even-numbered egress ports while the second line card would replicate and forward copies to the odd-numbered egress ports. In this case, a failure of the first card would further require adding the even-numbered ports to the forwarding specification for multicast in the second line card.

In one embodiment, a switch is realized with "stub" line cards that connect to internal ports of a supervisor card with the actual forwarding logic. The ingress port filters can be located either on the stub card or on the internal ports of the supervisor card, or both.

In one embodiment, one port is designated at the output for a given optical link, avoiding conflicts from transmission from two ports at the same time. On failure, the surviving line card assumes ownership of the link. Normally, there is limited benefit in load balancing on egress, given that the primary processing is performed on input. Moreover, transmission can be slowed by the switch under severe load with minimal impact, whereas, on egress, it cannot slow reception processing without dropping packets.

Embodiments may be realized by coupling multiple smaller-scale switches and some means to share the output links. For example, the output crossbar can accept outputs from both ports (with appropriate flow control) and sequence the output packets over the output link. However, care is required against allowing this merge component to become a single point of failure.

Each port can have a small input buffer in front of the forwarding processing and packet buffering, to average out the processing times for packets, allowing the forwarding logic to match just the average (or at least less the worst-case), assuming the input buffer averages out the required forwarding rate. With such a mechanism, a port can handle most realistic sequences of packets, allowing it to provide reasonable, yet perhaps slightly degraded service, when its pair-port fails, causing it to handle the full traffic load on a link. This input buffer also allows the ingress filter to be applied to a received packet, rather than having to apply as the packet is received.

Some embodiments have multiple links per input port, all merged by the input buffer above, in advance of forwarding logic, with ingress filters on each of these links. In this case, as above, the filters would be configured and the forwarding logic configured to balance the packet load while avoiding duplicated egress packets. For example, a port that is lightly loaded could be dynamically configured to accept some subset of a neighboring port's multicast traffic if the latter was excessively loaded by this traffic. The coupling of link to multiple ports can be accomplished electronically instead of optically if the link is not optical.

The ingress port filter can further be used to block traffic that has been determined to be harmful, such as some excessive traffic from a denial-of-service attacker. This blocking is more effective than conventional input access control lists because it can avoid saving the packet to the packet memory, as often occurs before a full access control list decision is made.

In one embodiment, filtering of packets according to the invention is performed using the existing access control list ("ACL") mechanism. In one embodiment, if the load balancing is focused on multicast, the filter can simply cause the packet to be dropped before replication. In a ternary content addressable memory ("CAM") implementation of ACLs, the ingress filter can be implemented as entry in the ACL that is merged into the input ACL CAM along with other features. Typically, these additional entry or entries are inserted into the CAM before all the normal ACL rules. Furthermore, the switch can be optimized for packet drop because of input ACL deny, potentially even to the point that the drop occurs before storing (all of) the packet to buffer memory. The fast fail-over in this approach can be implemented by several techniques. In the simplest case such as with an action table, all blocking entries for a given port can be mapped to a common action table entry that indicates drop. On fail-over to this port, the action table entry is simply changed to accept, disabling the blocking. Alternatively, the blocking entries may differ from the other "normal" entries by a software-reserved bit in the tag associated with the packet, which is masked off under normal conditions. On failure, the mask for these entries is changed to make this bit matched on, so no packets match the blocking entries. In one embodiment, software can also just explicitly disable all the deny entries for the filter associated with the associated port.

FIG. 1A illustrates one embodiment of a packet switching system. Although only one input interface 110, two filters 114 and 115, two packet switches or components 121-129, and one packer merger or switch 130 are illustrated in FIG. 1A for ease of reader understanding, it is to be understood that a packet switching system may, and typically does, contain more of these components than actually shown.

Packets 101 are received by an input interface 110 of the packet switching system. Configurable splitter 112 provides a copy of the received packet stream 101 to all filters 114-115. Splitter 112 may be an electrical connection, electrical device, an optical device, or any other signal splitting and/or replication device or technology. Filters 114-115 are programmed over control signals 113 and 116 as to which packets to forward and which packets to drop. One embodiment uses a set of rules which match values contained in a packet, which may include, but are not limited to source address, destination address, packet type, and quality of service values. In one embodiment, filters 114-115 are programmed such that during a normal operating state, on average, they forward approximately a same level of packet traffic or same number of packets.

Filters 114-115 are responsive to control signals 113 and 116 to switch from a normal operating state to a state of forwarding all packets or forwarding no packets. Using these three states, the load generated by a single packet stream can be distributed across multiple inputs, and in case of failure effecting packet traffic forwarded by less than all of filters 114-115, filters 114-115 can be modified to overcome the failure.

Packets forwarded by filters 114-115 are received by packet switches or components 121-129, which may be packet switch interfaces or actual packet switches themselves. These received packets are then routed as normal. In one embodiment, redundant and duplicate packet switches 121-129 are used for fault tolerant reasons, and packet merger or switch 130 merges, as required, output streams for the same destination generated by packet switches 121-129 into a single packet stream as indicated by packets 131.

Figure 1B:
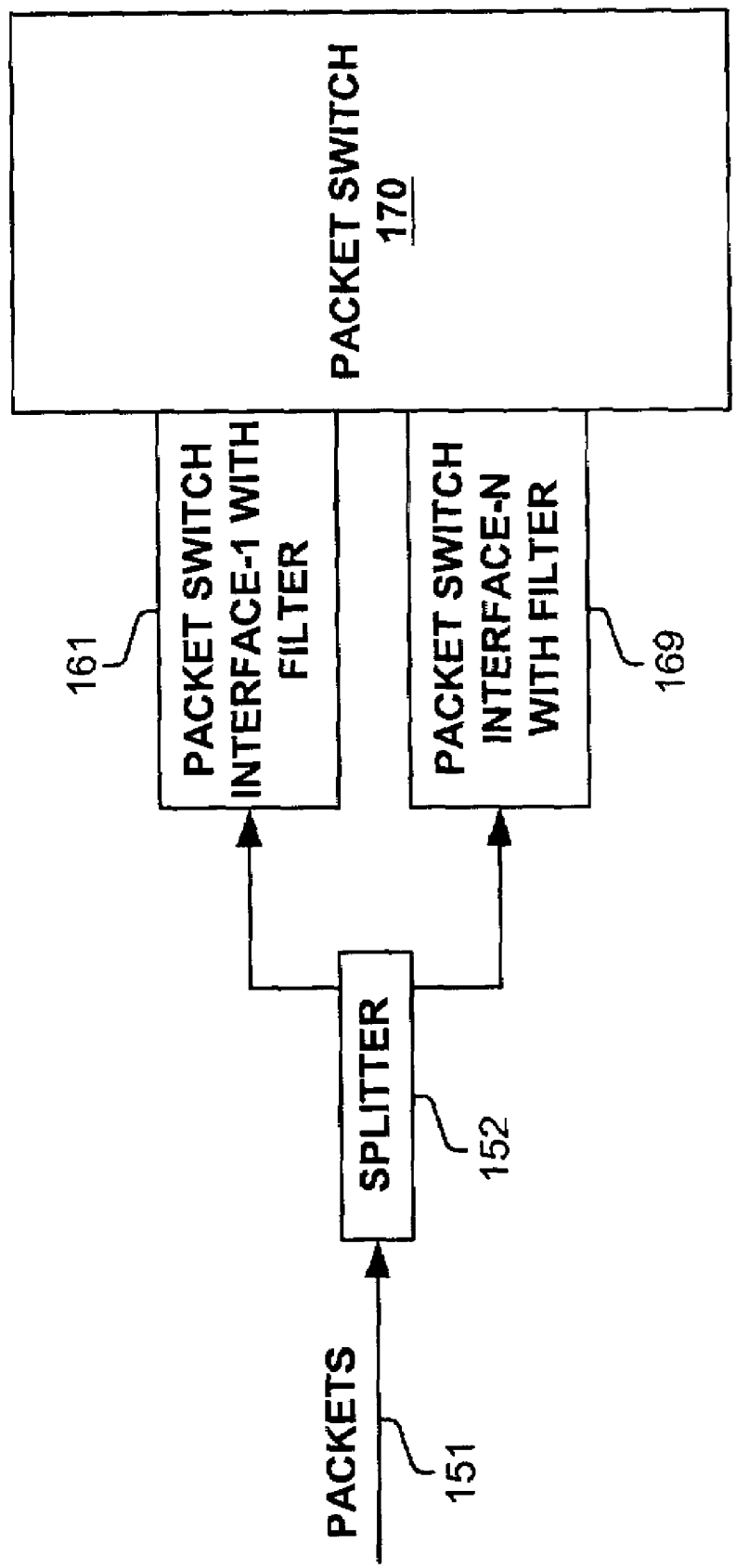

FIG. 1B illustrates another exemplary embodiment of a packet switching system according to the invention. A packet steam 151 is received by configurable splitter 152, which provides the packet stream to packet switch interfaces with filters 161-169, which perform the filtering as described herein, and provide the distribute and filtered streams to packet switch 170.

Figure 2:
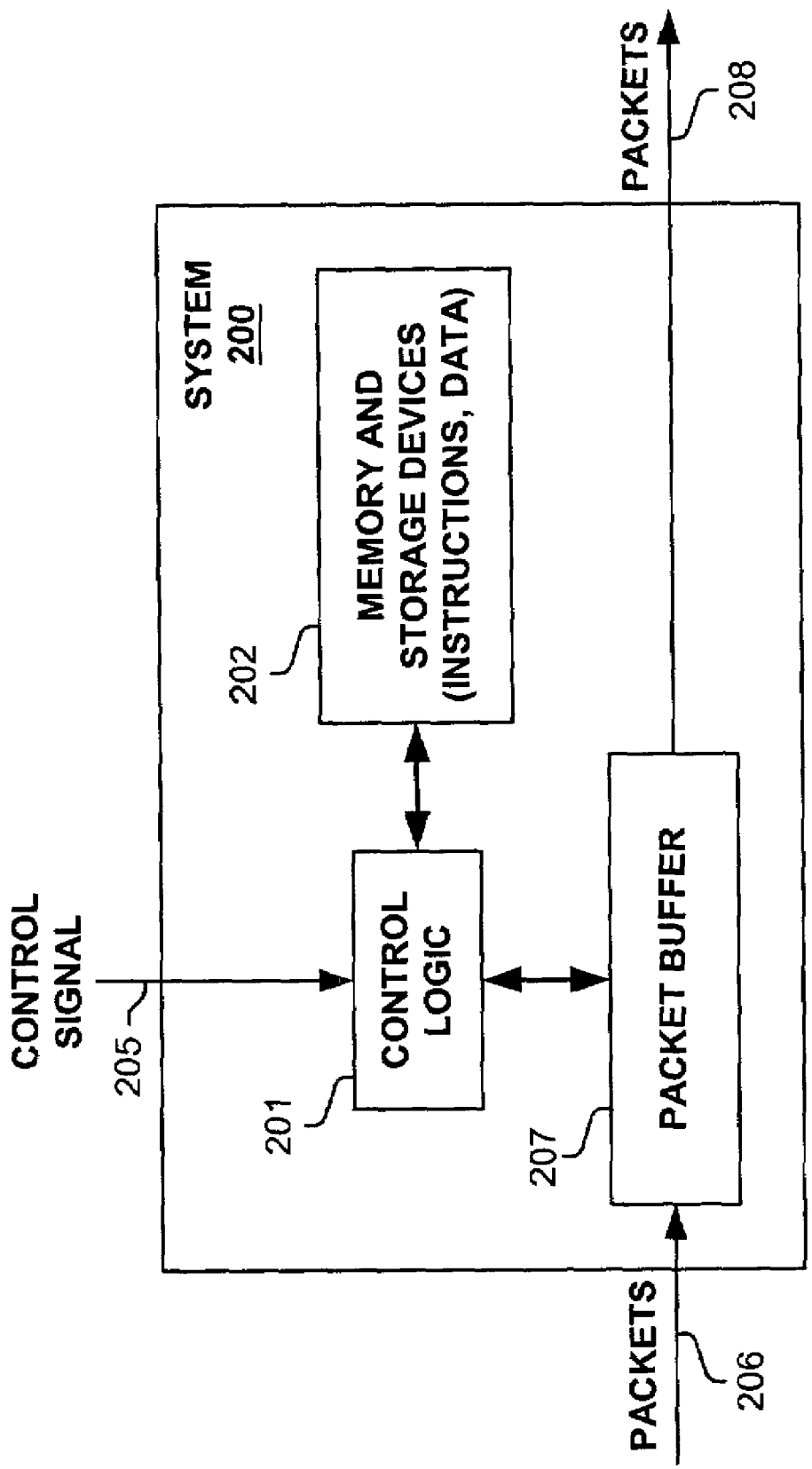
FIG. 2 is a block diagram of an exemplary embodiment of a packet filtering system.

FIG. 2 illustrates an exemplary embodiment of a configurable filtering system 200. Configurable filtering system 200 is programmed over control signal 205 as to which packets are to be forwarded and which packets are to be dropped. Typically, this programming comprises a set of rules which operate on values contained within a packet. Additionally, control logic 201, in response to control signal 205, dynamically can change its filtering policies.

In one embodiment as part of a fail-over or redundant system, configurable filtering system 200 includes at least three filtering states: normal operating mode, all packet forwarding, and all packet blocking. In the normal operating state, configurable filtering system 200 can be one of multiple filters which are used to load balance a stream of packets across redundant systems. Upon detection of a failure or in response to a manual request (such as when the system is undergoing selective maintenance), the packets dropped and forward by these filters can be readily and quickly be modified such that the received packet traffic is routed to avoid one or more of the redundant systems (or other downstream components or routes) which is experiencing trouble or for maintenance, etc.

In one embodiment, control logic 201 includes specialized hardware (e.g., CAMs), which are programmed with the filtering instructions. In one embodiment, control logic 201 includes a processor which uses memory and storage devices 202 to perform one or more tasks or processes. Memory and storage devices 202 is or more one types of computer-readable medium, and typically comprises random access memory (RAM), read only memory (ROM), flash memory, solid state circuits, integrated circuits, and/or other memory components, and may also comprise disk drives, diskettes, networked services, tape drives, and other storage devices. Memory and storage devices 202 typically store computer-executable instructions to be executed and/or data which is manipulated for implementing functionality in accordance with the invention.

As used herein and contemplated by the invention, computer-readable medium is not limited to memory and storage devices: rather computer-readable medium is an extensible term describing memory, storage device, and/or other storage mechanism that can be used to tangibly embody computer-executable instructions or data.

A packet stream 206 is received into packet buffer 207, and based on a forwarding decision performed by control logic 201, particular packets of packet stream 206 are either dropped or forwarded as indicated by egress packet stream 208.

Figure 3A:
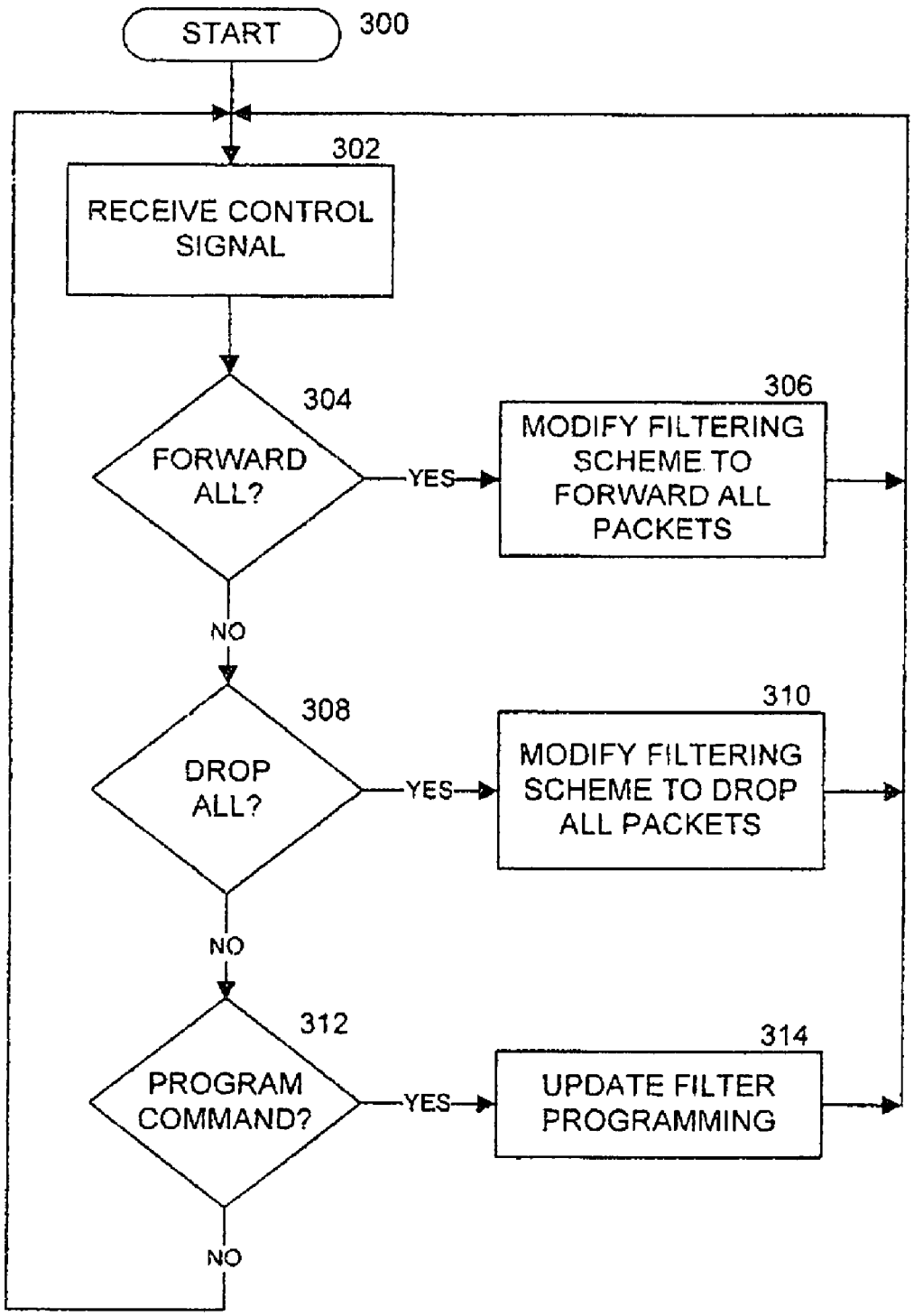
FIGS. 3A-B are block diagrams of processes used in one embodiment for ingress port filtering according to the invention.

FIG. 3A illustrates one process of one embodiment for programming and modifying the forwarding state of a configurable filter. Processing begins at process block 300, and proceeds to process block 302, wherein a control signal is received. As determined in process block 304, if the received signal indicates to forward all packets (e.g., in response to a detected error or fault condition or operator command), then the filtering scheme is modified in process block 306 to forward all packets. Otherwise, as determined in process block 308, if the received signal indicates to drop all packets (e.g., in response to a detected error or fault condition or operator command), then the filtering scheme is modified in process block 310 to drop all packets. Otherwise, as determined in process block 312, if the received signal is a set of programming commands, then the filtering scheme is updated in process block 314. Processing returns to process block 302 to receive and process more command signals.

Figure 3B:
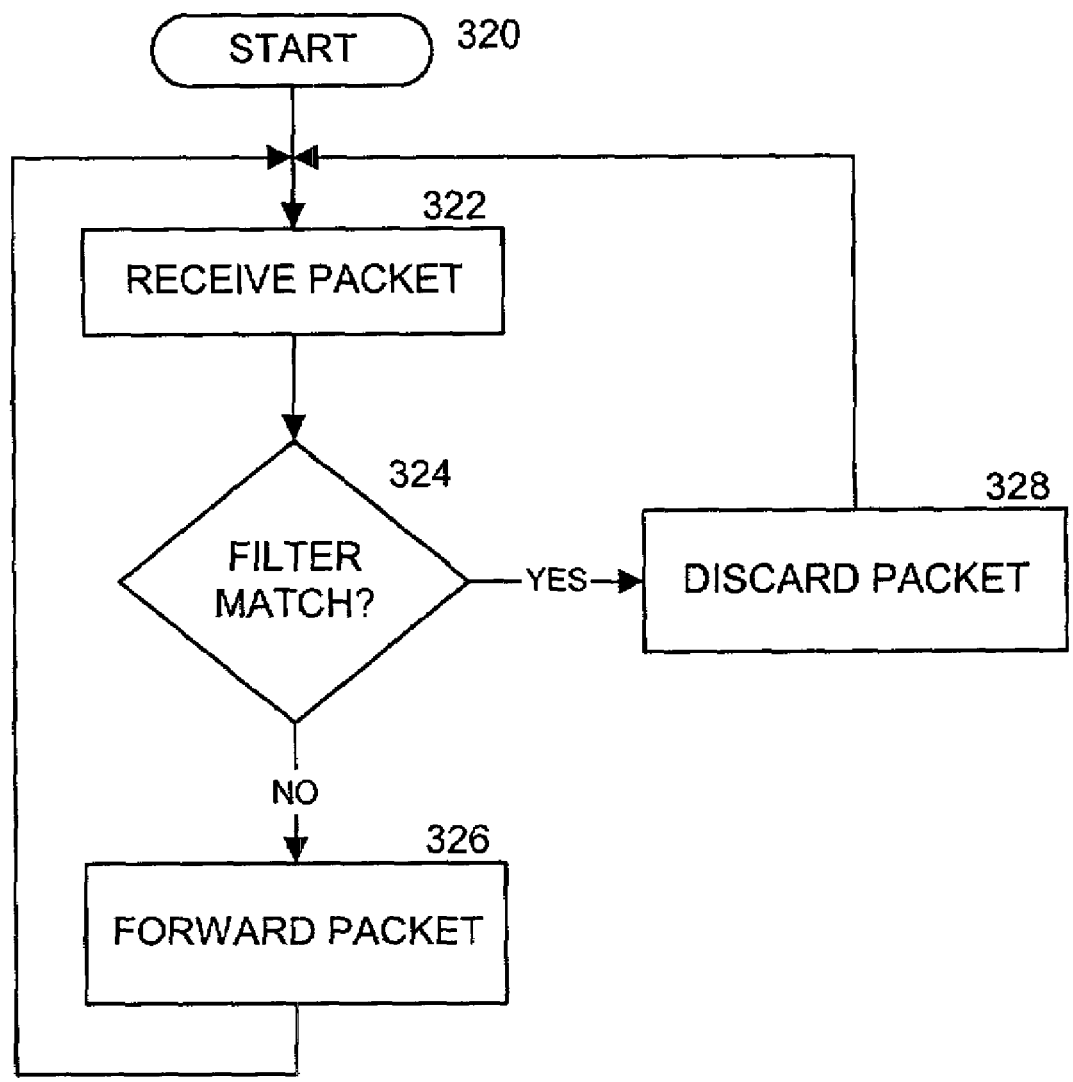

FIG. 3B illustrates one process used by one embodiment to determine whether or not to forward a particular packet. Processing begins at process block 320, and proceeds to process block 322 wherein a packet is received, typically into a packet buffer. Next, as determined in process block 324, if the filter scheme matches that the packet should be discarded (typically by applying a set of rules to values contained within the packet itself), then the packet is dropped in process block 328. Otherwise, the packet is forwarded in process block 326. Processing returns to process block 322 to receive and apply filtering policies to additional packets.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A packet switching system comprising:
a packet stream splitter;
an input interface of the packet switching system, and
a plurality of packet switches;
wherein the input interface includes a plurality of configurable filters coupled to the packet stream splitter and each of said configurable filters is communicatively coupled to a different single one of said packet switches;
wherein the packet stream splitter is configured to receive a packet stream and to provide a copy of said received packet stream to each of said configurable filters; and
wherein each of said configurable filters is configured to forward an identifiable set of packets of said received packet stream such that each packet of said received packet stream is forwarded by a single one of said configurable filters regardless of the packet switching system being in a normal operating mode or a second operating mode; and wherein all packets forwarded by a configurable filter are forwarded to its corresponding said different single one of said packet switches; and
wherein in a normal operating mode, each of said configurable filters is configured such that there is at least one packet in its said identifiable set of packets; and wherein in a second operating mode, a particular configurable filter of said configurable filters is configured to forward no packets, and said identifiable set of packets of at least one said configurable filters other than the particular configurable filter is different than when in the normal operating mode in order for all packets of said received stream of packets to be forwarded by a single one of said configurable filters.

2. The packet switching system of claim 1, wherein said configurable filters include exactly two configurable filters including the particular configurable filter and a second configurable filter, and in the second operating mode, the second configurable filter is configured to forward all packets of said received packet stream.

3. The packet switching system of claim 1, wherein each of said configurable filters determines whether to drop or forward a particular packet of said received packet stream based on at least one value contained within the particular packet.

4. The packet switching system of claim 1, wherein each of said configurable filters determines whether to drop or forward a particular packet based on a value of a source address, a destination address, a packet type, or a quality of service of the particular packet.

5. The packet switching system of claim 1, wherein said received packet steam is received in an optical signal by the packet stream splitter and the packet stream splitter includes an optical splitter such that each of said configurable filters receives said optical signal.

6. The packet switching system of claim 1, wherein the packet stream splitter includes an electrical splitter.

7. The packet switching system of claim 1, comprising a packet stream merger coupled to the each of said packet switches configured to merge packets received from said configurable filters.

8. The packet switching system of claim 1, wherein the input interface includes the packet stream splitter.

9. The packet switching system of claim 1, wherein said configurable filters include more than two configurable filters including the particular configurable filter and a plurality of other configurable filters, and in the second operating mode, the packets in said identifiable set of packets corresponding to the particular configurable filter in the normal operating mode are redistributed among said identifiable set of packets of at least two of said other configurable filters.

10. A packet switching system comprising:
a packet stream splitter; and
a first and a second configurable filters coupled to the packet stream splitter, the first and the second configurable filters each including a normal operating state;
wherein the packet stream splitter is configured to provide a received packet stream to each of the first and the second configurable filters; and
wherein when the first and the second configurable filters are simultaneously in their respective normal operating states: each particular packet of the received packet stream is forwarded only by one of the first and the second configurable filters and both the first and second configurable filters are configured to forward at least one packet of the received packet stream
wherein the first and the second configurable filters determine whether to drop or forward a particular packet based on at least one value contained within the particular packet.

11. The packet switching system of claim 10, wherein the first configurable filter further includes an all packet forwarding state, wherein the first configurable filter is configured to switch between the normal operating state and the all packet forwarding state in response to a signal.

12. The packet switching system of claim 11, wherein the signal is generated in response to detection of an error condition affecting a set of packets forwarded by the second configurable filter.

13. The packet switching system of claim 12, wherein the second configurable filter further includes an all packet blocking state, wherein the second configurable filter is configured to switch between the normal operating state and the all packet blocking state in response to the signal.

14. The packet switching system of claim 10, wherein the first and the second configurable filters determine whether to drop or forward a particular packet based on a value of a source address, a destination address, a packet type, or a quality of service of the particular packet.

15. The packet switching system of claim 10, wherein the first and the second configurable filters are each configured to forward approximately one-half of the packets received by the respective first or second configurable filter.

16. A packet switching system comprising:
a first means for filtering and forwarding;
a second means for filtering and forwarding; and
means for providing a received packet stream to each of the first means for filtering and forwarding and the second means for filtering and forwarding
wherein the first means for filtering and forwarding is configured to forward a first identifiable set of packets of said received packet stream, and the second means for filtering and forwarding is configured to forward a second identifiable set of packets of said received packet steam;
wherein when said first and second means for filtering and forwarding are in their respective normal operating states: a particular packet of the single received packet stream is forwarded only by one of said first and second means for filtering and forwarding and both said first and second means for filtering and forwarding are configured to forward at least one packet.

17. The packet switching system of claim 16, wherein said first means for filtering and forwarding includes an all packet forwarding state, wherein the first configurable filter is configured to switch between the normal operating state and the all packet forwarding state in response to a signal.

18. The packet switching system of claim 17, wherein the signal is generated in response to detection of an error condition affecting a set of packets forwarded by said second means for filtering and forwarding.

19. The packet switching system of claim 18, wherein said second means for filtering and forwarding includes an all packet blocking state, wherein said second first means for filtering and forwarding is configured to switch between the normal operating state and the all packet blocking state in response to the signal.

20. A method comprising:
receiving a stream of packets;
providing the stream of packets to both a first and a second configurable filters;
the first configurable filter determining whether or not to forward a particular packet from the stream of packets based on a first programmable filtering scheme;
the second configurable filter determining whether or not to forward a particular packet from the stream of packets based on a second programmable filtering scheme;
wherein each particular packet of said received stream of packets is forwarded only by one of the first and the second configurable filters and both the first and second configurable filters are configured to forward at least one packet of said received stream of Rackets when simultaneously the first configurable filter is responsive to the first programming scheme and the second configurable filter is responsive to the second programmable filtering scheme.

21. The method of claim 20, further comprising:
the first configurable filter receiving a first signal;
the first configurable filter, in response to receiving the first signal, modifying its filtering scheme to forward all packets or to drop no packets;
the second configurable filter receiving a second signal; and
the second configurable filter, in response to receiving the second signal, modifying its filtering scheme to forward no packets or to drop all packets.

22. The method of claim 20, wherein the first and the second configurable filters determine whether to drop or forward a particular packet based on at least one value contained within the particular packet.

23. The method of claim 20, wherein the first and the second configurable filters determine whether to drop or forward a particular packet based on a value of a source address, a destination address, a packet type, or a quality of service of the particular packet.

24. The method of claim 20, wherein the first and the second configurable filters are each configured to forward approximately one-half of the packets received by the respective first or second configurable filter.

25. A packet switching system comprising:
a packet stream splitter; and
a first and a second configurable filters coupled to the packet stream splitter, the first and the second configurable filters each including a normal operating state;
wherein the packet stream splitter is configured to provide a received packet stream to each of the first and the second configurable filters;
wherein when the first and the second configurable filters are in their respective normal operating states: a particular packet is forwarded only by one of the first and the second configurable filters and both the first and second configurable filters are configured to forward at least one packet; and
wherein the first and the second configurable filters determine whether to drop or forward a particular packet based on at least one value contained within the particular packet.

26. A method comprising:
receiving a stream of packets;
providing the stream of packets to a first and a second configurable filters;
the first configurable filter determining whether or not to forward a particular packet from the stream of packets based on a first programmable filtering scheme; and
the second configurable filter determining whether or not to forward a particular packet from the stream of packets based on a second programmable filtering scheme;
wherein a particular packet is forwarded only by one of the first and the second configurable filters and both the first and second configurable filters are configured to forward at least one packet; and
wherein the first and the second configurable filters determine whether to drop or forward a particular packet based on a value of a source address, a destination address, a packet type, or a quality of service of the particular packet.

* * * * *

UNITED STATES PATENT AND TRADEMARK OFFICE
CERTIFICATE OF CORRECTION

PATENT NO.         : 7,310,306 B1
APPLICATION NO. : 09/981125
DATED              : December 18, 2007
INVENTOR(S)       : Cheriton Page 1 of 1

It is certified that error appears in the above-identified patent and that said Letters Patent is hereby corrected as shown below:

Col. 8, line 20, replace "devices: rather" with -- devices; rather --

Col. 10, line 24, replace "stream" with -- stream; --

Col. 11, line 34, replace "Rackets" with -- packets --

Signed and Sealed this

Twenty-second Day of December, 2009

David J. Kappos
*Director of the United States Patent and Trademark Office*